US009787647B2

(12) United States Patent
Wu et al.

(10) Patent No.: US 9,787,647 B2
(45) Date of Patent: Oct. 10, 2017

(54) SECURE COMPUTER EVALUATION OF DECISION TREES

(71) Applicant: Microsoft Technology Licensing, LLC, Redmond, WA (US)

(72) Inventors: David J. Wu, Stanford, CA (US); Tony Feng, Avon, CT (US); Michael Naehrig, Sammamish, WA (US); Kristin Lauter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 14/558,636

(22) Filed: Dec. 2, 2014

(65) Prior Publication Data
US 2016/0156595 A1 Jun. 2, 2016

(51) Int. Cl.
*H04L 29/06* (2006.01)
*G06N 5/02* (2006.01)
*H04L 9/00* (2006.01)

(52) U.S. Cl.
CPC ........... *H04L 63/0428* (2013.01); *G06N 5/02* (2013.01); *H04L 9/008* (2013.01);
(Continued)

(58) Field of Classification Search
CPC . H04L 63/0428; H04L 9/008; H04L 2209/50; H04L 2209/08; H04L 2209/46; G06N 5/02
See application file for complete search history.

(56) References Cited

U.S. PATENT DOCUMENTS 6,834,272 B1 12/2004 Naor et al.
7,472,105 B2 * 12/2008 Staddon .............. G06F 21/6227
(Continued)

FOREIGN PATENT DOCUMENTS

EP 2485428 A2 8/2012
EP 2874341 A1 5/2015
(Continued)

OTHER PUBLICATIONS

Kantarcioglu, et al., "Privacy-Preserving Data Mining in the Malicious Model", In International Journal Information and Computer Security, vol. 2, Issue 4, Jan. 2009, 23 pages.
(Continued)

*Primary Examiner* — Beemnet Dada
*Assistant Examiner* — Stephen Gundry

(57) ABSTRACT

Decision trees can be securely evaluated with reasonable computation speed and bandwidth utilization. A user device encrypts input vectors using a client's public key in an additively homomorphic encryption system. A server computer effectively randomizes the decision tree for each use, such that a value indicative of a path resulting from applying an input vector to the decision tree is different each time the decision tree is used. The server computer homomorphically computes the evaluations of each decision node. The server computer provides the value indicative of the path through the decision tree as one part accessible by the client, and another part accessible by the server. The server computer uses the parts to look up a corresponding output value from a database of output values for each path. In this operation, only the output value corresponding to the combined parts can be retrieved, and only by the intended recipient.

20 Claims, 7 Drawing Sheets

(52) U.S. Cl.
CPC ...... *H04L 2209/08* (2013.01); *H04L 2209/46* (2013.01); *H04L 2209/50* (2013.01)

(56) References Cited

U.S. PATENT DOCUMENTS

| | | | |
|---|---|---|---|
| 7,685,115 B2 | 3/2010 | Avidan et al. | |
| 8,229,939 B2* | 7/2012 | Staddon | G06F 21/6227 280/255 |
| 8,271,796 B2 | 9/2012 | Diamond | |
| 8,370,621 B2* | 2/2013 | Raykova | H04L 9/008 380/255 |
| 8,478,768 B1* | 7/2013 | Pathak | G06Q 30/0282 707/754 |
| 8,515,058 B1* | 8/2013 | Gentry | H04L 9/008 380/28 |
| 8,539,220 B2 | 9/2013 | Raykova et al. | |
| 8,756,410 B2* | 6/2014 | Raykova | H04L 9/008 380/28 |
| 8,903,090 B2* | 12/2014 | Bikel | H04L 9/30 380/255 |
| 8,942,431 B2 | 1/2015 | Forero et al. | |
| 9,002,007 B2* | 4/2015 | Nabeel | H04L 9/008 380/255 |
| 9,009,089 B1 | 4/2015 | Ei Defrawy et al. | |
| 9,037,860 B1* | 5/2015 | Kerschbaum | H04L 63/0428 713/168 |
| 9,055,038 B1 | 6/2015 | Lu | |
| 9,195,939 B1* | 11/2015 | Goyal | G06N 5/02 |
| 9,208,438 B2* | 12/2015 | Goyal | G06N 5/02 |
| 9,275,334 B2* | 3/2016 | Sharma | G06N 5/02 |
| 9,306,738 B2 | 4/2016 | Loftus et al. | |
| 9,390,271 B2 | 7/2016 | Saldamli et al. | |
| 9,535,658 B2* | 1/2017 | Kolesnikov | G06F 7/24 |
| 2005/0201555 A1* | 9/2005 | Yen | H04L 9/3218 380/30 |
| 2006/0085651 A1* | 4/2006 | Staddon | G06F 21/6227 713/193 |
| 2007/0116283 A1* | 5/2007 | Tuyls | H04L 9/008 380/255 |
| 2007/0118746 A1 | 5/2007 | Lauter | |
| 2009/0119518 A1* | 5/2009 | Staddon | G06F 21/6227 713/193 |
| 2009/0268908 A1* | 10/2009 | Bikel | H04L 9/30 380/255 |
| 2010/0306543 A1 | 12/2010 | Kolesnikov | |
| 2011/0191586 A1 | 8/2011 | Jung | |
| 2011/0211692 A1* | 9/2011 | Raykova | H04L 9/008 380/46 |
| 2012/0002811 A1 | 1/2012 | Smart | |
| 2012/0144185 A1* | 6/2012 | Raykova | H04L 9/008 713/150 |
| 2012/0151205 A1* | 6/2012 | Raykova | H04L 9/085 713/150 |
| 2012/0201378 A1 | 8/2012 | Nabeel et al. | |
| 2012/0227105 A1 | 9/2012 | Friedrichs et al. | |
| 2012/0233460 A1 | 9/2012 | Kamara et al. | |
| 2013/0114811 A1 | 5/2013 | Boufounos et al. | |
| 2013/0173917 A1* | 7/2013 | Clifton | G06F 21/6227 713/167 |
| 2013/0185239 A1* | 7/2013 | Dedeoglu | G06N 5/003 706/46 |
| 2013/0204905 A1 | 8/2013 | Ioffe | |
| 2013/0216044 A1* | 8/2013 | Gentry | H04L 9/008 380/277 |
| 2013/0236112 A1* | 9/2013 | Oka | H03M 7/3062 382/232 |
| 2013/0254532 A1* | 9/2013 | Raykova | H04L 9/008 713/153 |
| 2013/0268469 A1* | 10/2013 | Sharma | G06N 5/02 706/12 |
| 2013/0339751 A1* | 12/2013 | Sun | H04L 9/008 713/189 |
| 2013/0343616 A1 | 12/2013 | Forero et al. | |
| 2014/0040614 A1 | 2/2014 | Kolesnikov et al. | |
| 2014/0041039 A1 | 2/2014 | Saldamli et al. | |
| 2014/0089908 A1 | 3/2014 | Dunn et al. | |
| 2014/0108435 A1* | 4/2014 | Kolesnikov | G06F 7/24 707/754 |
| 2014/0121990 A1 | 5/2014 | Baldi et al. | |
| 2014/0177828 A1* | 6/2014 | Loftus | H04L 9/008 380/44 |
| 2014/0298018 A1 | 10/2014 | Haggerty | |
| 2014/0372769 A1* | 12/2014 | Kerschbaum | H04L 9/008 713/189 |
| 2015/0089243 A1* | 3/2015 | Veugen | G06F 21/72 713/190 |
| 2015/0149773 A1* | 5/2015 | Kerschbaum | H04L 63/0428 713/168 |
| 2015/0341326 A1* | 11/2015 | Premnath | H04L 63/062 713/171 |
| 2015/0349949 A1* | 12/2015 | Boufounos | H04W 12/08 380/270 |
| 2015/0381349 A1* | 12/2015 | Nikolaenko | H04L 9/008 713/189 |
| 2016/0004874 A1* | 1/2016 | Ioannidis | H04L 9/008 713/165 |
| 2016/0020898 A1* | 1/2016 | Nikolaenko | H04L 9/008 713/168 |
| 2016/0036584 A1* | 2/2016 | Nikolaenko | H04L 9/008 380/28 |
| 2016/0044003 A1* | 2/2016 | Raykova | H04L 9/008 713/150 |
| 2016/0119119 A1* | 4/2016 | Calapodescu | H04L 9/008 380/30 |
| 2016/0182222 A1 | 6/2016 | Rane et al. | |
| 2016/0191233 A1 | 6/2016 | Loftus | |

FOREIGN PATENT DOCUMENTS

| | | |
|---|---|---|
| WO | 2008135951 A1 | 11/2008 |
| WO | 2014137392 A1 | 9/2014 |

OTHER PUBLICATIONS

Huang, et al., "Quid-Pro-Quo-tocols: Strengthening Semi-Honest Protocols with Dual Execution", In Proceedings of 33rd IEEE Symposium on Security and Privacy, May 2012, 13 pages.

Bost, et al, "Machine Learning Classification over Encrypted Data", In Proceedings of IACR Cryptology ePrint Archive, vol. 2014, Oct. 15, 2014, 34 pages.

Mohassel, et al., "Oblivious Decision Programs from Oblivious Transfer: Efficient Reductions", In Proceedings of 16th International Conference on Financial Cryptography and Data Security, Feb. 27, 2012, 15 pages.

"Non-Final Office Action Issued in U.S. Appl. No. 14/558,652", Mailed Date: Apr. 8, 2016, 12 Pages.

Amirbekyan, et al., "The Privacy of k-NN retrieval for Horizontal Partitioned Data-New Methods and Applications", In Proceedings of the Eighteenth Australasian Database Conference, Jan. 29, 2007, 10 Pages.

Elmehdwi, et al., "Secure k-Nearest Neighbor Query over Encrypted Data in Outsourced Environments", In Proceedings of the 30th IEEE International Conference on Data Engineering, Mar. 31, 2014, pp. 664-675.

Elmehdwi, et al., "Secure k-Nearest Neighbor Query over Encrypted Data in Outsourced Environments", In Proceedings of CORR, Jul. 19, 2013, 23 Pages.

Kolesnikov, et al., "How to Combine Homomorphic Encryption and Garbled Circuits", In Proceedings of Signal Processing in the Encrypted Domain-First SPEED Workshop-Lausanne, Sep. 10, 2009, 22 Pages.

Kolesnikov, et al., "Improved Garbled Circuit Building Blocks and Applications to Auctions and Computing Minima", In Proceedings of 8th International Conference on Cryptology and Network Security, Dec. 12, 2009, pp. 125-144.

Lauter, et al., "Private Computation on Encrypted Genomic Data", In Privacy Enhancing Technologies Symposium, Workshop on Genome Privacy, Jul. 29, 2014, 21 Pages.

(56) References Cited

OTHER PUBLICATIONS

Lopez-Alt, et al., "On-the-Fly Multiparty Computation on the Cloud via Multi key Fully Homomorphic Encryption", In Proceedings of the Forty-fourth Annual ACM Symposium on Theory of Computing, May 19, 2012, pp. 1219-1234.
"International Search Report and Written Opinion Issued in PCT Application No. PCT/US2015/062846", Mailed Date: Mar. 3, 2016, 11 Pages.
"Second Written Opinion Issued in PCT Application No. PCT/US2015/062846", Mailed Date: Nov. 4, 2016, 7 Pages.
"International Search Report and Written Opinion Issued in PCT Application No. PCT/US2015/062847", Mailed Date: Aug. 18, 2016, 13 Pages.
Qi, et al., "Efficient Privacy-Preserving k-Nearest Neighbor Search", In Proceedings of the 28th International conference on Distributed Computing Systems, Jun. 17, 2008, pp. 311-319.
Rane, et al., "Privacy-Preserving Nearest Neighbor Methods", Retrieved from <<http://boufounos.com/Publications/RB_SPM13_PPNN.pdf>>, Oct. 10, 2014, 12 Pages.
Sahni, et al., "To Maintain Privacy Using Add Multiply and K-Mediod", In International Journal of Recent Development in Engineering and Technology, vol. 2, Issue 4, Apr. 2014, pp. 50-54.
Samanthula, et al., "k-Nearest Neighbor Classification over Semantically Secure Encrypted Relational Data", In computing Research Repository, Mar. 10, 2014, 29 pages.
Thoma, et al., "Secure Multiparty Computation Based Privacy Preserving Smart Metering System", In Proceedings of North American Power Symposium, Sep. 9, 2012, 6 Pages.
Xie, et al., "Bounded Fully Homomorphic Signature Schemes", In Proceedings IACR Cryptology ePrint Archive, vol. 2014, Oct. 10, 2014, 25 pages.
Zhan, et al., "Privacy Preserving K-nearest Neighbor Classification", In International Journal of Network Security, vol. 1, Issue 1, Jul. 2005, pp. 46-51.
Zheng, et al., "An efficient Image Homomorphic Encryption Scheme with Small Ciphertext Expansion", In Proceedings of the 21st ACM International Conference on Multimedia, Oct. 21, 2013, pp. 803-812.
"Final Office Action Issued in U.S. Appl. No. 14/558,652", Mailed Date: Dec. 16, 2016, 13 Pages.
Mell et al., "The NIST Definition of Cloud Computing", 2011, NIST, p. 1-7.
"BigML", Retrieved from <<http://web.archive.org/web/20140101090546/https://bigml.com/>>, Jan. 1, 2014, 2 Pages.
"Microsoft Azure Machine Learning", Retrieved from <<http://web.archive.org/web/20151229060832/https://azure.microsoft.com/en-us/services/machine-learning/>>, Dec. 29, 2015, 10 Pages.
Agrawal, et al., "Privacy-Preserving Data Mining", In Proceedings of the ACM SIGMOD International Conference on Management of Data, May 16, 2000, pp. 439-450.
Asharov, et al., "More Efficient Oblivious Transfer and Extensions for Faster Secure Computation", In Proceedings of the ACM SIGSAC Conference on Computer & Communications Security, Nov. 4, 2013, pp. 535-548.
Azar, et al., "Decision Tree Classifiers for Automated Medical Diagnosis", In Neural Computing and Applications, vol. 23, Issue 7-8, Dec. 2013, pp. 2387-2403.
Bache, et al., "UCI Machine Learning Repository", In Journal of Computer and Communications, vol. 2, Issue 8, Jan. 2013, 1 Page.
Barni, et al., "Secure Evaluation of Private Linear Branching Programs with Medical Applications", In European Symposium on Research in Computer Security, Jan. 2009, 20 Pages.
Bellare, et al., "Efficient Garbling from a Fixed-Key Blockcipher", In Proceedings of the IEEE Symposium on Security and Privacy, May 19, 2013, 34 Pages.
Bellare, et al., "Foundations of Garbled Circuits", In Proceedings of the ACM Conference on Computer and Communications Security, Oct. 1, 2012, 45 Pages.

Bellare, et al., "On Defining Proofs of Knowledge", In Lecture Notes in Computer Science on Appears in Advances in Cryptology, vol. 740, Aug. 26, 1992, 28 Pages.
Blake, et al., "Strong Conditional Oblivious Transfer and Computing on Intervals", In Proceedings of the International Conference on the Theory and Application of Cryptology and Information Security, Jan. 2004, pp. 515-529.
Bogdanov, et al., "Sharemind: A Framework for Fast Privacy-Preserving Computations", In Proceedings of the 13th European Symposium on Research in Computer Security: Computer Security, Oct. 6, 2008, 23 Pages.
Boneh, Dan, "The Decision Diffie-Hellman Problem", In Proceedings of the 3rd International Symposium on Algorithmic Number Theory, Jun. 21, 1998, 14 Pages.
Bos, et al., "Private Predictive Analysis on Encrypted Medical Data", In Journal of Biomedical Informatics, vol. 50, Aug. 2014, 19 Pages.
Bos, et al., "Selecting Elliptic Curves for Cryptography: An Efficiency and Security Analysis", In Journal of Cryptographic Engineering, vol. 6, No. 4, 29 Pages.
Bos, et al., "Specification of Curve Selection and Supported Curve Parameters in MSR ECCLib", In Technical Report MSR-TR-2014-92, Microsoft Research, Jun. 2014, 4 Pages.
Brakerski, et al., "(Leveled) Fully Homomorphic Encryption Without Bootstrapping", In Proceedings of the 3rd Innovations in Theoretical Computer Science Conference, Jan. 8, 2012, pp. 309-325.
Breiman, Leo, "Random Forests", In Machine Learning, vol. 45, Issue 1, Jan. 2001, 28 Pages.
Brickell, et al., "Privacy-Preserving Remote Diagnostics", In Proceedings of the 14th ACM Conference on Computer and Communications Security, Oct. 28, 2007, pp. 498-507.
Camenisch, et al., "Efficient Group Signature Schemes for Large Groups (Extended Abstract)", In Proceedings of the 17th Annual International Cryptology Conference on Advances in Cryptology, Aug. 17, 1997, 15 Pages.
Canetti, Ran, "Security and Composition of Cryptographic Protocols: A Tutorial (Part I)", In ACM SIGACT News, vol. 37, Issue 3, Sep. 1, 2006, pp. 67-92.
Canetti, Ran, "Security and Composition of Multiparty Cryptographic Protocols", In Journal of Cryptology, vol. 13, Issue 1, Jun. 5, 1998, 46 pages.
Chaum, et al., "Wallet Databases with Observers", In Proceedings of the 12th Annual International Cryptology Conference on Advances in Cryptology, Aug. 16, 1992, pp. 89-105.
Cramer, et al., "A Secure and Optimally Efficient Multi-Authority Election Scheme", In Lecture Notes in Computer Science on in Advances in Cryptology, vol. 1233, May 11, 1997, pp. 103-118.
Cramer, et al., "Proofs of Partial Knowledge and Simplified Design of Witness Hiding Protocols", In Proceedings of the 14th Annual International Cryptology Conference on Advances in Cryptology, Aug. 21, 1994, 14 Pages.
Crescenzo, et al., "Conditional Oblivious Transfer and Timed-Release Encryption", In Proceedings of the 17th International Conference on Theory and Application of Cryptographic Techniques, May 2, 1999, 16 Pages.
DamgÅrd, et al., "A Generalization of Paillier's Public-Key System with Applications to Electronic Voting", In International Journal of Information Security, vol. 9, Issue 6, Dec. 1, 2010, 27 Pages.
DamgÅrd, et al., "Efficient and Secure Comparison for On-Line Auctions", In Proceedings of the 12th Australasian Conference on Information Security and Privacy, Jul. 2, 2007, 15 Pages.
Demmler, et al., "ABY—A Framework for Efficient Mixed-Protocol Secure Two-Party Computation", NDSS Publisher, Jan. 2015, 15 Pages.
Du, et al., "Building Decision Tree Classifier on Private Data", In Proceedings of the IEEE International Conference on Privacy, Security and Data Mining, vol. 14, Dec. 1, 2002, 8 Pages.
Erkin, et al., "Privacy-Preserving Face Recognition", In Proceedings of the International Symposium on Privacy Enhancing Technologies Symposium, Jan. 2009, 19 Pages.

(56) References Cited

OTHER PUBLICATIONS

Fiat, et al., "How to Prove Yourself: Practical Solutions to Identification and Signature Problems", In Proceedings on Advances in Cryptology, Jan. 1987, 9 Pages.
Fredrikson, et al., "Model Inversion Attacks that Exploit Confidence Information and Basic Countermeasures", In Proceedings of the 22nd ACM SIGSAC Conference on Computer and Communications Security, Oct. 12, 2015, pp. 1322-1333.
Gentry, Craig, "A Fully Homomorphic Encryption Scheme", A Dissertation Submitted to the Department of Computer Science and the Committee on Graduate Studies of Stanford University in Partial Fulfillment of the Requirement for the Degree of Doctor of Philosophy, Sep. 2009, 209 pages.
Goldreich, Oded, "Foundations of Cryptography", In Book of Foundations of Cryptography, Basic Applications, Cambridge University Press, vol. 2, Aug. 4, 2002, 24 pages.
Goldwasser, et al., "Probabilistic Encryption", In Journal of Computer and System Sciences, vol. 28, Issue 2, Apr. 1984, pp. 270-299.
Goldwasser, et al., "The Knowledge Complexity of Interactive Proof-Systems (Extended Abstract)", In Proceedings of the 17th Annual ACM Symposium on Theory of Computing, May 6, 1985, pp. 291-304.
Graepel, et al., "ML Confidential: Machine Learning on Encrypted Data", In Proceedings of the 15th International Conference on Information Security and Cryptology, Nov. 28, 2013, 15 pages.
Granlund, et al., "GNU MP: The GNU Multiple Precision Arithmetic Library", Retrieved from <<http://gmplib.org/.>>, Dec. 19, 2016, 4 pages.
Halevi, et al., "Algorithms in HElib", In Proceedings of the International Cryptology Conference, Jan. 2014, 20 Pages.
HÅstad, et al., "A Pseudorandom Generator from Any One-Way Function", In SIAM Journal on Computing, vol. 28, Issue 4, Mar. 1, 1999, 46 Pages.
Hastie, et al., "The Elements of Statistical Learning", In Springer Series in Statistics, Second Edition, 2001, 764 Pages.
Hazay, et al., "Efficient Secure Two-Party Protocols—Techniques and Constructions", In Information Security and Cryptography, Jul. 14, 2010, 30 Pages.
Huberman, et al., "Enhancing Privacy and Trust in Electronic Communities", In Proceedings of the 1st ACM Conference on Electronic Commerce, Nov. 1, 1999, 9 Pages.
Ishai, et al., "On Achieving the "Best of Both Worlds" in Secure Multiparty Computation", In SIAM Journal on Computing, vol. 40, Issue 1, 23 Pages.
Katz, et al., "Constant-Round Private Function Evaluation with Linear Complexity", In Proceedings of the 17th International Conference on The Theory and Application of Cryptology and Information Security, Dec. 4, 2011, 16 Pages.
Kilian, Joe, "Founding Cryptography on Oblivious Transfer", In Proceedings of the 20th Annual ACM Symposium on Theory of Computing, Jan. 1, 1998, 12 Pages.
Koh, et al., "A Two-Step Method to Construct Credit Scoring Models with Data Mining Techniques", In International Journal of Business and Information, vol. 1, Issue 1, Jan. 2006, pp. 96-118.
Kolesnikov, et al., "Improved Garbled Circuit: Free XOR Gates and Applications", In Proceedings of the 35th International Colloquium on Automata, Languages and Programming, Part II, Jul. 7, 2008, 12 pages.
Lindell, et al., "A Proof of Security of Yao's Protocol for Two-Party Computation", In Journal of Cryptology, vol. 22, Issue 2, Apr. 6, 2009, 28 Pages.
Lindell, et al., "Privacy Preserving Data Mining", In Proceedings of the Annual International Cryptology Conference, Jan. 2000, 28 Pages.
Mohassel, et al., "How to Hide Circuits in MPC: An Efficient Framework for Private Function Evaluation", In Proceedings of the Annual International Conference on the Theory and Applications of Cryptographic Techniques, May 26, 2013, 34 pages.
Naor, et al., "Efficient Oblivious Transfer Protocols", In Proceedings of the 12th Annual ACM-SIAM Symposium on Discrete Algorithms, Jan. 7, 2001, pp. 448-457.
Naor, et al., "Oblivious Transfer and Polynomial Evaluation", In Proceedings of the 31st Annual ACM Symposium on Theory of Computing, May 1, 1999, pp. 245-254.
Narayanan, et al., "Location Privacy via Private Proximity Testing", In NDSS, vol. 11, Jan. 2011, 17 pages.
Pallier, Pascal, "Public-Key Cryptosystems Based on Composite Degree Residuosity Classes", In Proceedings of the International Conference on the Theory and Applications of Cryptographic Technique, May 2, 1999, 16 pages.
Rabin, Michael O., "How to Exchange Secrets with Oblivious Transfer", in IACR Cryptology ePrint Archive, May 20, 1981, 26 pages.
Shoup, Victor, "NTL: A Library for Doing Number Theory", Retrieved from <<http://www.shoup.net/ntl/>>, Jan. 2001, 2 pages.
Singh, et al., "A Comparison of Non-Symmetric Entropy-Based Classification Trees and Support Vector Machine for Cardiovascular Risk Stratification", In Proceedings of the Annual International Conference of the IEEE on Engineering in Medicine and Biology Society, Aug. 30, 2011, pp. 79-82.
Wu, et al., "Privately Evaluating Decision Trees and Random Forests", in ACR Cryptology ePrint Archive, Report 2015/386, Oct. 2016, 35 pages.
Yao, Andrew Chi-Chih, "How to Generate and Exchange Secrets (Extended Abstract)", In Proceedings of the 27th Annual Symposium on Foundations of Computer Science, Oct. 27, 1986, pp. 162-167.
Zahur, et al., "Two Halves Make a Whole—Reducing Data Transfer in Garbled Circuits using Half Gates", In Proceedings of the Annual International Conference on the Theory and Applications of Cryptographic Techniques, Jan. 12, 2015, 22 pages.
"Non-Final Office Action Issued in U.S. Appl. No. 14/558,652", dated Apr. 7, 2017, 10 pages.
"International Preliminary Report on Patentability Issued in PCT Application No. PCT/US2015/062846", dated Mar. 13, 2017, 8 Pages.
"Notice of Allowance Issued in U.S. Appl. No. 14/558,652", dated Jul. 31, 2017, 13 pages.

* cited by examiner

Directed graph (G) 300
    vertex set (V) 302
    edge set (E) 304
    root node (v1) 306
    terminal nodes 308
    labeling function F 310
    evaluation functions f 312
        set of (v, iv, tv triples)

Data structure 370
    terminal node id 372
    actual value 374

Feature vector 320
    feature 1 322
    ...
    feature n

SECURE COMPUTER EVALUATION OF DECISION TREES

BACKGROUND

A decision tree is a form of classifier which is commonly implemented on a computer for machine learning and machine pattern recognition tasks. It is often desirable to implement a classifier on a computer in a way that allows other computers to submit input data to be applied to the classifier and to receive results from the classifier. However, in some situations, an entity providing input data does not want other entities to access that input data. Similarly, an entity providing the classifier does not want another entity to learn any information about the classifier, other than the result corresponding to the input data provided by that entity.

SUMMARY

This Summary is provided to introduce a selection of concepts in a simplified form that are further described below in the Detailed Description. This Summary is intended neither to identify key or essential features, nor to limit the scope, of the claimed subject matter.

Decision trees can be securely evaluated in practical applications, with reasonable computation speed and bandwidth utilization, using a combination of techniques. A user device encrypts input vectors using a client's public key in an additively homomorphic encryption system. A server computer effectively randomizes the decision tree for each use, such that a value indicative of a path resulting from applying an input vector to the decision tree is different each time the decision tree is used. The server computer homomorphically computes the evaluations of each decision node. The client and server computer exchange results from the decision tree through an implementation of oblivious transfer. In particular, the server computer provides the value indicative of the path through the decision tree in two parts: one accessible by the client, the other accessible by the server. The server computer uses the combined parts to look up a corresponding output value from a database of output values for each path. In this look up operation, only the output value corresponding to the combined parts can be retrieved, and only by the intended recipient, i.e., the client.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3 is a diagram of example data structures for representing a decision tree.

DETAILED DESCRIPTION

Figure 1:
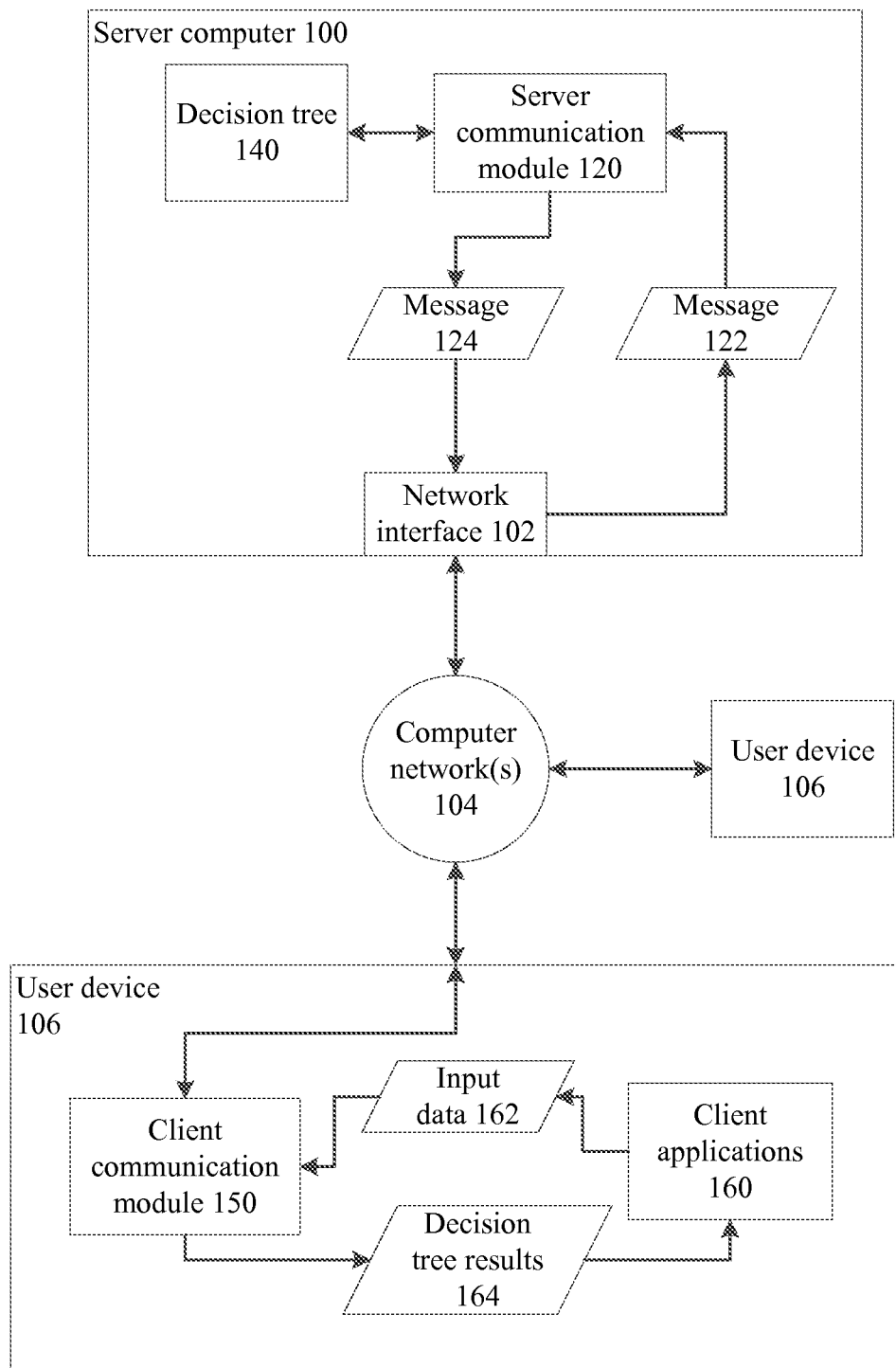
FIG. 1 is a block diagram of an example application environment in which a server computer makes a decision tree available for use by user devices.

Referring to FIG. 1, an example implementation of such a computer system for secure evaluation of decision trees, and its operating environment, will now be described.

In FIG. 1, a server computer 100, implemented using one or more computers such as described below in connection with FIG. 7, hosts a computer implementation of one or more decision trees 140, such as described in more detail below. A collection of related decision trees is sometimes called a "forest". The server computer 100 has one or more network interfaces 102 to connect to one or more computer networks 104. The computer network 104 allows user devices 106 to connect to and communicate with the server computer 100. User devices 106 also are implemented as one or more computers such as described below in connection with FIG. 7.

The server computer 100 includes a server communication module 120 which implements a communication protocol for managing the server side of communication between the user devices and the server computer over the computer network. The server communication module processes messages 122 from user devices 106 and converts them into commands applied to the decision tree 140. The server communication module also converts results received from the decision tree 140 into messages 124 returned to the user devices 106. An example of such a server communication module is a secure hypertext transfer protocol (HTTPS) server program, executed as an HTTPS process on the server computer 100, which processes HTTPS messages from and to user devices. The HTTPS process generally is configured, in turn, to transmit commands to other processes executed on the server computer, such as a process that results from executing computer program instructions that define the one or more decision trees 140.

Similarly, user devices 106 include a client communication module 150 which implements the communication protocol for managing the client side of communication between the user devices 106 and the server computer 100 over the computer network. The client communication module controls the user device to transmit messages 122 from the user device 106 to the server computer over the computer network. The client communication module processes messages 124 returned to the user devices 106 from the server computer. The client communication module implements the same communication protocol as the server computer 100, such as HTTPS or other secure protocol. An example of such a client communication module is a secure hypertext transfer protocol (HTTPS) client program, executed as a process on the user device 106, which processes HTTPS messages to and from server computers. The HTTPS client process generally is configured, in turn, to transmit contents of messages from the server computer to other processes executed on the user device. Herein, these other processes are called "client applications" 160.

A client application 160, in this context, is a computer program executed on the user device, which causes the user device to generate input data 162 for processing by the one or more decision trees 140 on the server computer 100. In general, such a client application 160 receives the results 164 obtained by having the decision tree 140 process the input data 162.

A client application can take any of a variety of forms, depending on the nature of the input data 162 to be processed and how it is classified by the decision tree. Generally speaking, the input data is a form of a vector of one or more values which is input for a machine learning or machine recognition operation. For example, the decision tree can perform speech recognition in response to a vector of speech features derived from an audio signal. A decision tree can perform image recognition in response to a vector of image features derived from an image. A decision tree can perform handwriting recognition in response to a vector of features extracted from sampled handwriting, such as through a touchscreen interface. Other example applications include, but are not limited to, spam classification of electronic messages, machine translation, credit risk assessment and other financial risk or valuation estimations, medical and other kinds of conditional diagnoses and assessments, and the like. The user device can include various sensors to sample input data, which the client application can convert to an input vector for processing.

The invention is not limited to the nature or purpose of decision tree; instead, the security of such remote utilization of a decision tree is provided through a system such as described herein. In many applications, such decision trees can be large, by including more than one hundred decision nodes. In such applications, the client application provides the input data to the client communication module 150, and receives the results from the decision tree through the client communication module. In many such applications, the input data from the client application can be sensitive information for which privacy or confidentiality is to be maintained. Further, the data within the decision tree may also be proprietary or confidential and access to this data is to be restricted. The system evaluates the decision tree securely, with reasonable computation speed and bandwidth utilization.

There are a variety of possible implementations of such a computer system, depending on the environment in which it is deployed.

For example, the server computer may be connected to a publicly accessible computer network, such as the internet, and can accept connection requests from any kind of user device that can connect to the internet and communicate with the server computer. In such a case, the user device(s) can be, for example, a mobile phone, television set top box, smart television, personal computer, portable computer, tablet, slate or other handheld computer, game console or the like. In some implementations, the user device is configured to respond to user input to submit input data to the server computer for processing using the decision tree. In yet other implementations, the server computer and computer network can be deployed for access by user devices that are programmed to utilize the server computer's decision tree without user intervention. The client computer and server computer can be deployed with complementary communication modules to allow them to communicate over the computer network. The server computer also can be configured to distribute a computer program to the user device, after establishing a communication connection with the user devices, so as to provide a communication module and/or a client application to be executed on the user device.

Figure 2:
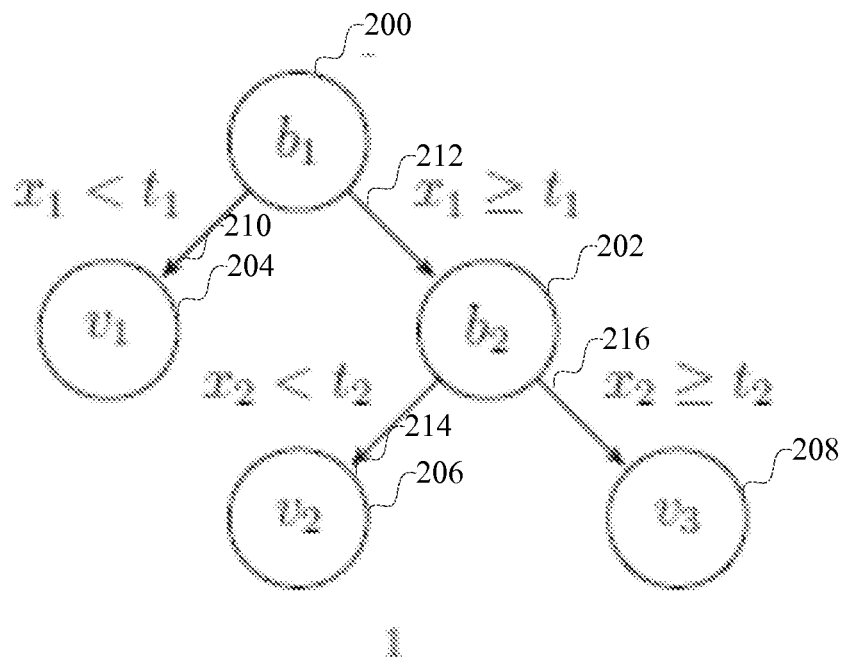
FIG. 2 illustrates an illustrative example of a decision tree.

Referring to FIG. 2, an illustrative example of a decision tree will now be described. This example is simplified to illustrate how a decision tree works, to assist in understanding the example implementations described in further detail below. In practical, real-world applications, a decision tree typically has a much larger number of decision nodes and leaf nodes. The example implementations described below provide a way to practically implement secure evaluation of the decision tree given a user input.

As shown in FIG. 2, a decision tree has a plurality of nodes, such as shown at 200, 202, 204, 206, 208. Some nodes (e.g., 200, 202) are decision or non-terminal nodes, with a first decision node (e.g., 200) receiving an input vector V to be classified by the decision tree. Edges, 210, 212, 214 and 216 represent conditional tests applied to the input vector. Each decision node can be assigned an identifier or value (e.g., b1 for node 200, b2 for node 202).

In a complete binary decision tree, each non-terminal node can be assigned a unique (among nodes in the tree) index. An example indexing algorithm is the following. With the root node assigned "1", then, for any node v with an index of k, and left and right child nodes vL and vR, the index of the left child vL is 2k and the index of the right child vR is 2k+1.

A decision node has a plurality of edges which are associated with conditional tests. These conditional tests for a decision node are mutually exclusive and complete, such that for any given input data there is one, and only one, edge for which the input data meets the conditional test.

In a binary decision tree, each node has two edges, representing two possible outcomes (true or false) of a conditional test associated with the node and applied to the input vector. For example, given an input vector V=[x1, x2], a first decision node (e.g., 200) can apply a first conditional test (e.g., c1: x1<t1), and a second decision node (e.g., 202) can apply a second conditional test (e.g., c2: x2<t2). By convention, the two edges can be called "left" and "right" edges, and the corresponding subsequent decision nodes (e.g., 202 and 204) can be called "left" and "right" "child" nodes of the "parent" node (e.g., 200).

Other nodes 204, 206 and 208 are called "terminal" or "leaf" nodes and have a corresponding value, e.g., v1, v2 and v3, respectively. This value can be a label, identifier or other value that represents the output of the decision tree in response to input of the input vector V. The output is often considered a classification of the input vector V. Thus, the output value can be any value from which the classification of the input vector V can be understood by the recipient of that value.

This classification can be defined by the set of conditional tests along the path from the input node (e.g., 200) to the terminal node. For example, output node 208 represents the class of input vectors for which x1≥t1 and x2≥t2. Similarly, output node 206 represents the class of input vectors for which x1≥t1 and x2<t2. And, output node 204 represents the class of input vectors for which x1<t1.

This classification, alternatively, can be defined by the set of nodes or edges traversed through the decision tree. For example, the output value of output node 208 can be a vector of identifiers of the nodes 200 and 202, i.e., [b1, b2], or the edges between these nodes, e.g., [(b1, b2), (b2,v3)]. For a binary tree, the computer can represent the output node as a sequence of bits representing the path, with each bit indicating an edge followed (e.g., "0" for left or "1" for right) from each node, i.e., "11" for node 208.

A decision tree typically is created by a "learning" or "training" process based on a training set of data. Such learning or training processes are typically performed once to create a decision tree, and then the decision tree can be replicated and deployed in multiple devices. In some applications, it is possible to continue to update the decision tree while it is in use. The present invention is not limited to any particular learning or training process used to develop a decision tree.

In a typical unsecure computer implementation of a decision tree, the various parameters defining the decision tree are fixed, such as identifiers of nodes, conditional tests performed, output values of terminal nodes, and the set of edges from the input node to each terminal node. The input vectors and output values are typically unencrypted. It would be possible, in such an implementation in the context of remotely processed decision tree, for an entity to learn about the structure of the decision tree by applying a set of input vectors to the decision tree and analyzing the results. Conversely, it would be possible for an entity providing a decision tree to store input vectors supplied for processing, and associate each entity with its input vectors, and in turn to learn about the information provided by each entity.

Decision trees can be securely evaluated in practical applications, with reasonable computation speed and bandwidth utilization, using a combination of techniques. A user device encrypts input vectors using a client's public key in an additively homomorphic encryption system. A server computer effectively randomizes the decision tree for each use, such that a value indicative of a path resulting from applying an input vector to the decision tree is different each time the decision tree is used. The server computer homomorphically computes the evaluations of each decision node. The client and server computer exchange results from the decision tree through an implementation of oblivious transfer. In particular, the server computer provides the value indicative of the path through the decision tree in two parts: one accessible by the client, the other accessible by the server. The server computer uses the combined parts to look up a corresponding output value from a database of output values for each path. In this look up operation, only the output value corresponding to the combined parts can be retrieved, and only by the intended recipient, i.e., the client.

Referring now to FIG. 3, a set of data structures for storing data representing a decision tree will now be described.

The following description applies to a complete binary decision tree. However, any non-binary tree can be transformed into a binary tree. Also, by introducing dummy nodes, any incomplete binary tree can be transformed into a complete binary tree. Accordingly, the following description can apply to any decision tree, with the decision tree being converted into a complete binary tree.

In view of the foregoing description of FIG. 2, a binary decision tree can be defined in a data structure, as shown in FIG. 3, by the combination of a directed graph (300), herein called "G", which is defined by is a vertex set "V" (302) and an edge set "E" (304). One of the vertices in the vertex set "V" is identified as a root node (306), herein called "v1". A subset of the vertices in the vertex set V is identified as the terminal nodes (308). A labeling function 310, herein called F, assigns an output value to each terminal node. For example, F can be a function that generates a value, for each terminal node, indicative of the path through the decision tree from the root node to the terminal node. With a binary tree, the function F can generate a sequence of bits representing the path, with each bit indicating an edge followed (e.g., "0" for left or "1" for right) from each node. Another function 312, herein called evaluation function f, assigns an evaluation function IV (in a binary tree, this is a Boolean function) to each non-terminal vertex. For example, a function $f: Z^d \rightarrow R$ of the form $f(x)=1\{x_{iv}<t_v\}$, where $1 \leq iv \leq d$ is an index into the feature vector x and $t_v \in Z$ is a threshold. In an example implementation, data that represents such a function includes a triplet that includes, for each node v, an index iv into the input vector x, and a corresponding threshold tv.

In an example implementation, actual values corresponding to identifiers of the terminal nodes can be represented as a database, which in this context is any data stored in a data structure 370 in storage that can map a value 372 associated with a terminal node to the actual values 374, such as an array. In such an implementation, the comparisons defined by the decision nodes can be computed in parallel, and a string representing the combination of decision bits maps directly to the terminal nodes. The computer applies the string of decision bits to the database to extract the actual value associated the terminal node.

The input to the decision tree is a feature vector 320, which can include a large number of features 322 which depend on the client application. To simplify computations, the feature vector preferably is processed so that all values are integers greater than or equal to zero.

The feature vector is encrypted within the user device using the client's public key and is considered private data from the perspective of the server computer that processes the feature vector using the decision tree. Similarly, data returned by the server computer to the user device also is encrypted using the client's public key.

The cryptosystem is additively homomorphic and supports scalar multiplication. As a simplification in the selection of a cryptosystem, the process below avoids fully decrypting ciphertexts by relying on a mechanism for deciding whether a ciphertext is an encryption of 0 or not. Thus, the primary operation used is to test whether a given ciphertext is an encryption of "0". An example of such a cryptosystem is the exponential ElGamal cryptosystem.

Figure 4:
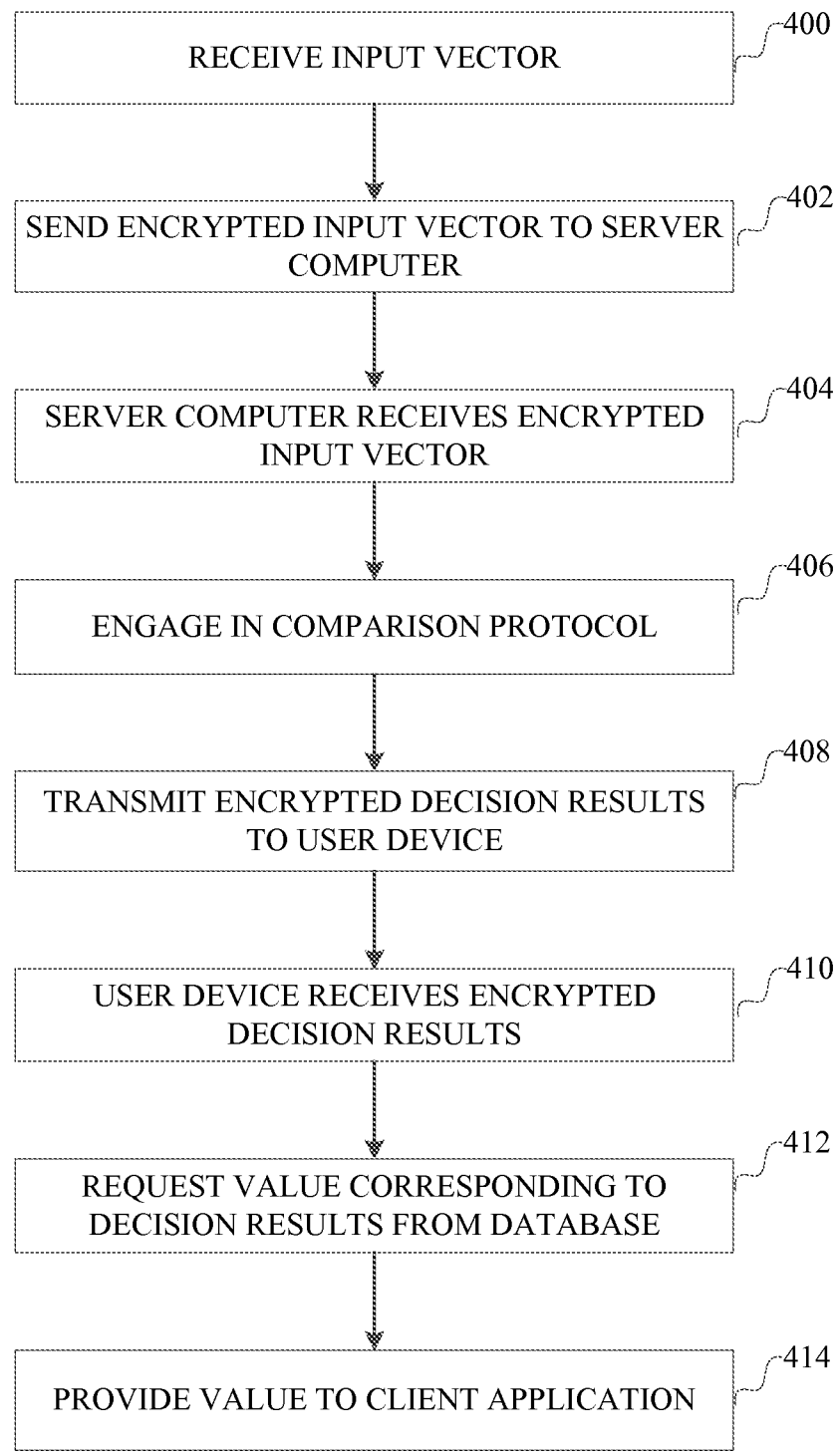
FIG. 4 is a flow chart describing operation of an example implementation of such a computer system.

In this example implementation, a process for securely evaluating an input vector with a decision tree is performed, in one implementation, in a manner such as described in FIG. 4.

The client communication module receives 400 the input vector from the client application. The client communication module encrypts 402 the input vector using the client's public key and transmits the encrypted input vector to the server computer over the computer network. The server computer receives 404 the encrypted input vector, where it is processed by the server communication module.

At this stage, the server computer and the user device generally engage 406 in a comparison protocol in which the input vector is compared to the thresholds associated with the nodes in the decision tree. Some example implementations of this protocol are described in more detail below. The result of the comparison protocol is an encrypted representation of results of the input vector evaluated by an effectively randomized version of the decision tree. The encrypted results represent a decision string, which is a set of outcomes of all the comparisons related to all of the decision nodes in the decision tree. The server communication module transmits 408 the encrypted results to the user device, which is received 410 by the client communication module. In turn, the client communication module requests 412 any corresponding value from the decision tree database through the server computer, again through an encrypted protocol. The client communication module in turn provides 414 the actual value to the client application.

The following section will describe two example implementations of the comparison protocol and lookup process described above in connection with 406-412 of FIG. 4. In both example implementations, the server computer effectively randomizes the decision tree. In addition, the encrypted results are in two parts: one part is sent to and is accessible by the user device; another part is accessible by the server computer. The server computer uses the combined parts to look up a corresponding output value from a database of output values for each path.

To randomize a decision tree, the computer can interchange the two child nodes of any internal node in the decision tree, and replace the indicator bit bi for that particular node with a new bit bi'=1−bi. The transformation preserves the functionality of the decision tree. The computer can implement a randomized transformation of a whole decision tree using a random bit string s, of length m bits, where m is the number of decision nodes in the decision tree, such that s=s1 . . . sm←$\{0,1\}^m$, where si is the ith bit of the bit string s. For each decision node vi in the decision tree, its comparison function fvi can be transformed into a new fvi' as follows: fvi'=fvi if si=0, and fvi'=¬ fvi if si=1.

In a first example implementation, after obtaining the string of decision bits, the string of decision bits is randomized using bit string s, which is the same as applying the input vector to a randomized decision tree. In the second example implementation, described in more detail below, the decision tree is randomized, and then the string of decision bits is obtained.

Figure 5:
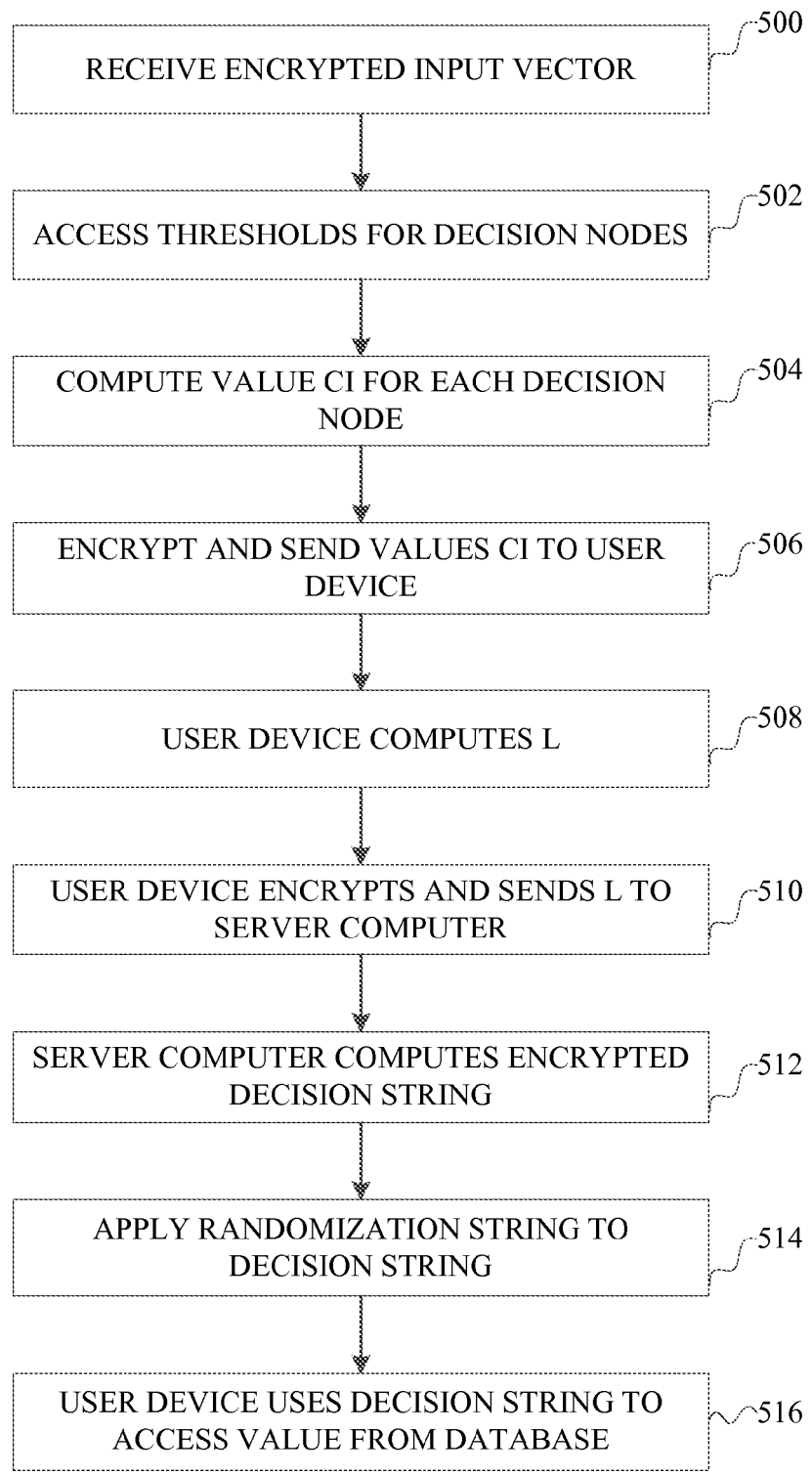
FIG. 5 is a flow chart describing operation of a first example implementation of a comparison protocol.

In the first implementation, now described in connection with FIG. 5, the server computer receives 500 the encrypted input vector, with each bit of each feature in the input vector encrypted using the client's public key. The server computer accesses 502 the thresholds corresponding to each decision node. The server computer computes 504 a value ci for each bit for the decision node using a corresponding bit from the selected feature of the input vector, and the corresponding bit from the threshold for that decision, according to the following equation 1:

$$c_x = r_s \cdot [x_s - y_i n + 3 \cdot \Sigma_{j<s}(x_j s \oplus y_j)].$$

To perform this computation step, the server computer first augments the input value with an encryption (using the client's public key) of the value 0 in the least significant bit, effectively substituting 2x for the input value x. The server computer also substitutes the threshold y with 2y+1. This computation avoids invoking the protocol on a condition where the input value is equal to the threshold value. For each bit i, xi−yi+s is homomorphically computed, where s=1−2b, where b is the ith bit of a value randomly selected for each decision node by the server computer. For all lesser significant bits j than the current bit i, the exclusive-or between xj and yj is homomorphically computed; these values are summed, and then multiplied by 3. This sum is multiplied by another value ri, where r is drawn uniformly from Zp, where p>3t−1, and t is the number of bits in the values being compared.

The server computer sends 506 the values ci, which are encrypted according to the client's public key, in a random order to the user device. The values computed for all decision nodes can be sent in one message in one transaction with the user device. The user device decrypts the values ci and computes 508 a corresponding value b', using the following equation 2:

$$b' \leftarrow 1\{\exists i : c_x = \dot{0}\}$$

This computation of b' is such that, if all ci are 0, then b' is 1; otherwise, b' is 0. The value of b', combined with the value of b, is indicative of whether x<y. In particular, b XOR b'=1{x≤y}. Thus, for each decision node, the server computer has one bit (b) indicative of the result of the comparison, and the user device has one bit (b') indicative of the result of the comparison. The combination of these two values, across all decision nodes, can be used to lookup the actual value output by the decision tree corresponding to the input vector.

The user device encrypts 510 the values b' it has received using its public key, and sends the encrypted values to the server computer. Using the additive homomorphic properties of the encryption, the server computer then homomorphically computes 512 the following equation 3 for each decision node:

$$\text{Enc}(1\{x \le y\}) = \text{Enc}(b') \text{XOR } \text{Enc}(b)$$

The result of equation 3 applied to each decision node is an encrypted decision string. A randomization bit string s is applied 514 to the encrypted decision string, effectively randomizing the decision tree, which is sent to the user device. The user device in turn uses the encrypted decision string to request 516 the corresponding value from decision tree database in the server computer.

Figure 6:
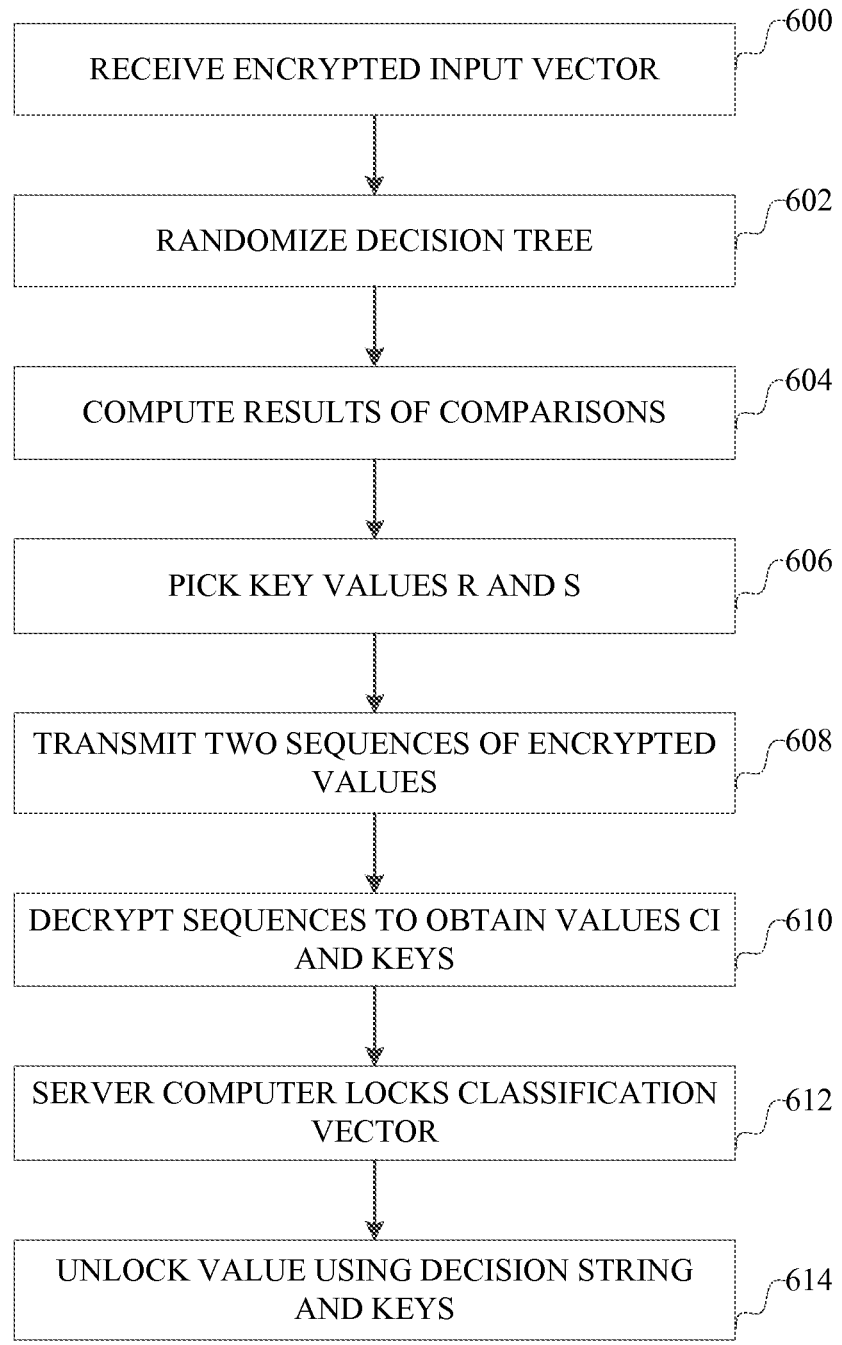
FIG. 6 is a flowchart describing operation of a second example implementation of a comparison protocol.

In the second implementation, now described in connection with FIG. 6, the server computer receives 600 the encrypted input vector, with each bit of each feature in the input vector encrypted using the client's public key. In this implementation, in response to this input vector, the user device ultimately receives data from which a value b' indicating, given a value x and y, whether x<y or whether x≥y, but not which one. The server computer also uses a bit b that indicates to the server computer the nature of the comparison to be performed. The combination of b and b', as noted above in FIG. 4, indicates the actual comparison result. Also, in this implementation, the server computer randomizes 602 the decision tree before evaluating the decision tree with the input vector.

As an additional verification step, the user device can send zero-knowledge proofs that each of its ciphertexts is a bitwise encryption. In turn, the server computer can compute a verification of these proofs, and optionally abort the operation if the proof fails to verify.

In this example implementation, the server computer also implements a "locking" operation. The locking operation uses keys associated with each edge to compute, for each leaf node, a locking function using the keys for the edges on the evaluation path to that leaf node. In particular, the server selects a set of blinding factors, scalars, for each decision node, drawn uniformly from Zp, one associated with each value of the bit b. The keys assigned to each edge are the sets of keys derived from multiplying the client's public key by these scalars. The use of the locking function in the protocol is described in more detail below.

The server computer, for each decision node, given b, the blinding factors a and a', and the randomized decision tree with keys assigned to its edges, computes 604 the results of the comparisons ci and ci' using the following equation 4:

$$c_s = r_s \cdot [x_i - y_i + s + 3\Sigma_{j<s}(x_j \oplus y_j)] \quad c'_s = r'_s \cdot [x_i - y_i - s + 3 \cdot \Sigma_{j<s}(x_j \oplus y_j)]$$

Equation 4 is effectively equation 1 described above, but evaluated twice given ri and ri', where both r and r' are uniformly drawn from Zp, and is computed in a similar manner.

Next, the server computer picks 606 key values p1, . . . , pn and p1', . . . , pn', drawn uniformly from Zp, and then generates 608, and transmits to the user device, four sequences of encrypted values as follows, where the entries in A and B are randomly permuted with the same permutation, and entries in A' and B' are randomly permuted with the same permutations:

$A = (\text{Enc}(c_1), \ldots, \text{Enc}(c_n))$ $B = (\text{Enc}(c_1\rho_1+\alpha_0), \ldots, \text{Enc}(c_n\rho_n+\alpha_0))$ $A' = (\text{Enc}(c'_1), \ldots, \text{Enc}(c'_n))$ $B' = (\text{Enc}(c'_1\rho'_1+\alpha_1), \ldots, \text{Enc}(c'_n\rho'_n+\alpha_1))$ The set of sequences is a blinded response vector. The user device, in turn, decrypts 610 the sequences A and A' to obtain the values {c1, ..., cn} and {c1', ..., cn'}. For each ci, if ci=0, then the user device decrypts the corresponding ith entry of the sequence B, to retrieve the key (a function of a0 and the client's public key), and the bit b'=0. For each ci', if ci'=0, then the user device decrypts the corresponding ith entry of the sequence B', to retrieve the key (a function of a1 and the client's public key), and then the bit b'=1. At the completion of this process for each decision node, the user device has a bit b' and a key.

In the foregoing, the server computer has associated a key with each edge of the decision tree. The manner in which the comparison results are transmitted to the user device is such that the user device only obtains the keys for those edges along the path to the terminal node. Effectively, the server computer and user device exchange a one-time pad that unlocks only the output value for the leaf node that is the evaluation result of the decision tree. The locking function thus can lock each entry (which corresponds to a leaf node) of the output vector with all of the keys attached to the edges on the unique path corresponding to that entry or leaf node. Because the keys are one-time pads, the user device can only unlock an output value for a leaf node if the user device possesses all of the keys on the evaluation path for that leaf node.

The server computer creates 612 a "locked" classification vector by applying a locking function using the keys constructed for the randomized decision tree to the database of the decision tree output values. This locked classification vector is sent to the user device. In turn, the user device uses the decision string of values b' and corresponding keys to unlock 614 the actual value corresponding to the leaf node resulting from evaluating the decision tree.

While the foregoing example is based on a complete binary decision tree, the protocol also can be used to securely evaluate random forests. In a random forest, there are several disjoint decision trees, and the results are aggregated for classification. For example, the results of the disjoint decision trees may be averaged. Using the protocol above, the user device receives the encryption of the result for each decision tree. When converting these encrypted results to the actual values, for each tree Ti the user device has EncB(ci). In the user device random blinders $r_i \leftarrow Z/p$ are selected and used to compute and send EncB(ci+ri) to the server computer to decrypt. The server computer then sends the user device an aggregation $\Sigma(c_i+r_i)$ from which the user device can recover $\Sigma c_i$.

In the foregoing description it should be understood that the terms "randomization" or "random", and the like, do not signify only truly random numbers. Any pseudorandom process that is cryptographically strong may be used. In particular, any pseudorandom process that generates a sequence of numbers that is computationally indistinguishable from a uniformly random sequence of numbers over the domain can be used.

In terms of performance, on high complexity decision trees such as a decision tree with up to a depth of 20 layers and over 10000 decision nodes, a computer program implementation of the foregoing can provide classification results for an input vector in a few seconds utilizing bandwidth of between 100 KB and 10 MB. The complexity of the foregoing implementation in FIG. 4 can be characterized by order $O(t(m+n)+d)$ where t is the number of bits used to represent each feature in the input vector, n is the dimension of the feature space (the number of features in the input vector), m is the number of decision nodes in the decision tree and d is the depth of the decision tree.

Accordingly, in one aspect, a server computer includes a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage. When processed by the processor, the computer program instructions instruct the processor to receive an encrypted input vector from a user device; engage in a comparison protocol in which the encrypted input vector is compared to thresholds associated with decision nodes of a decision tree; transmit encrypted results of applying the input vector to the decision tree to the user device, wherein the encrypted results represent a decision string; receive a request from the user device for a value from a decision tree database corresponding to the encrypted results; and transmit the value from the decision tree database in encrypted form to the user device.

In another aspect, a server computer includes a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage. When processed by the processor, the computer program instructions instruct the processor to store in memory a received encrypted input vector from a user device; to process the encrypted input vector from memory using a processor, engaging in a comparison protocol, to homomorphically compute a comparison of the encrypted input vector to thresholds associated with decision nodes of a decision tree; store encrypted comparison results in memory; transmit encrypted results to the user device, wherein the encrypted results represent a decision string; store in memory a received request from the user device for a value from a decision tree database corresponding to the encrypted results; and transmit the value from the decision tree database in encrypted form to the user device.

In another aspect, a user device includes a processor, memory connected to the processor to allow access by the processor to data stored in the memory, persistent storage connected to the processor to allow access by the processor to data stored in the persistent storage, a network interface connected to the processor and the memory to allow access by the user device to a computer network and to allow the user device to communicate messages over the computer network to and from a server computer hosting a decision tree, and computer program instructions stored in at least one of the memory and persistent storage. When processed by the processor, the computer program instructions instruct the processor to encrypt an input vector; transmit the encrypted input vector to the server computer to engage in a comparison protocol with the server computer; store in memory a received encrypted result string from the server computer; decrypt the encrypted result string with the processor to generate in memory a decision string; transmit the decision string to the server computer; store in memory an encrypted output value of the decision tree received from the server computer.

In any of the foregoing aspects, engaging in the comparison protocol includes effectively randomizing the decision tree.

In any of the foregoing aspects, engaging in the comparison protocol comprises generating a decision string as a result of evaluating the decision tree and randomizing the decision string, or comprises randomizing the decision tree and then generating a decision string by evaluating the randomized decision tree.

In any of the foregoing aspects, generating the decision string includes computing an encrypted comparison result for each decision node.

In any of the foregoing aspects, engaging in the comparison protocol further comprises computing an encrypted comparison result for each decision node as a function of a conditional value known to the server computer.

In any of the foregoing aspects, engaging in the comparison protocol further comprises computing keys for transmission to the user device, wherein the keys define an encryption of results of the decision tree.

In any of the foregoing aspects, the keys comprises a set of keys, each key being associated with an edge of the decision tree, and wherein engaging in the comparison protocol further comprises transmitting the keys to the user device such that each key is retrievable by the user device only if the edge associated with the key corresponds to a true comparison result between the input device decision nodes in the decision tree.

In any of the foregoing aspects, the user device includes one or more sensors for converting received signals to input data for processing by the decision tree.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Having now described an example implementation of computer system for secure evaluation of decision trees, an example implementation of a computer as may be used to implement such a computer system will now be described. The computer generally includes computer hardware, such as described in FIG. 7 below, and computer programs providing instructions to be executed by the computer. Computer programs on a general purpose computer generally include an operating system and applications. The operating system is a computer program running on the computer that manages access to various resources of the computer by the applications and the operating system. The various resources generally include memory, storage, communication interfaces, input devices and output devices.

The computer can be any type of general-purpose or special-purpose computer, such as a tablet computer, hand held computer, smart phone, laptop or notebook computer, wearable computing device, or any other computing device, regardless of size or environment, more details and examples of which are discussed below in connection with FIG. 7.

Figure 7:
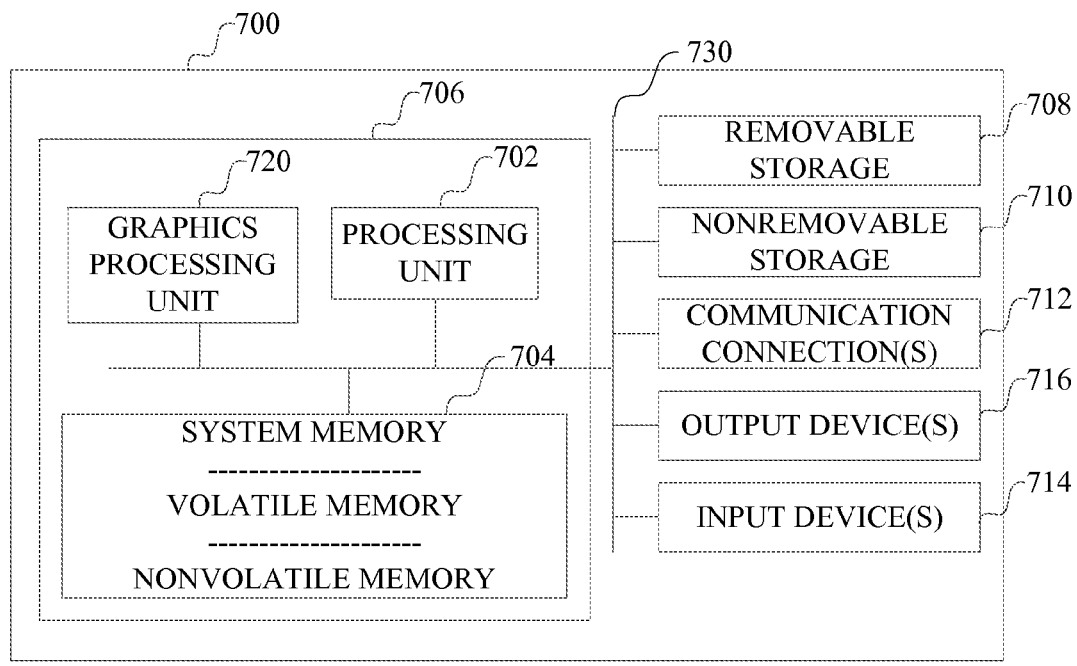
FIG. 7 is a block diagram of an example computer with which components of such a system can be implemented.

FIG. 7 illustrates an example of computer hardware of a computer with which the various components of the system of FIGS. 1-6 can be implemented using computer programs executed on this computer hardware. The computer hardware can include any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, and distributed computing environments that include any of the above types of computers or devices, and the like.

With reference to FIG. 7, an example computer 700 includes at least one processing unit 702 and memory 704. The computer can have multiple processing units 702 and multiple devices implementing the memory 704. A processing unit 702 can include one or more processing cores (not shown) that operate independently of each other. Additional co-processing units, such as graphics processing unit 720, also can be present in the computer. The memory 704 may include volatile devices (such as dynamic random access memory (DRAM) or other random access memory device), and non-volatile devices (such as a read-only memory, flash memory, and the like) or some combination of the two. This configuration of memory is illustrated in FIG. 7 by dashed line 706. The computer 700 may include additional storage (removable and/or non-removable) including, but not limited to, magnetically-recorded or optically-recorded disks or tape. Such additional storage is illustrated in FIG. 7 by removable storage 708 and non-removable storage 710. The various components in FIG. 7 are generally interconnected by an interconnection mechanism, such as one or more buses 730.

A computer storage medium is any medium in which data can be stored in and retrieved from addressable physical storage locations by the computer. Computer storage media includes volatile and nonvolatile memory devices, and removable and non-removable storage media. Memory 704 and 706, removable storage 708 and non-removable storage 710 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 700 may also include communications connection(s) 712 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 712 are devices, such as a network interface or radio transmitter, that interface with the communication media to transmit data over and receive data from signals propagated through communication media.

Computer 700 may have various input device(s) 714 such as a keyboard, mouse, pen, camera, microphone, touch input device, sensors, and so on. Output device(s) 716 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 710, communication connections 712, output devices 716 and input devices 714 can be integrated within a housing with the rest of the computer, or can be connected through various input/output interface devices on the computer, in which case the reference numbers 710, 712, 714 and 716 can indicate either the interface for connection to a device or the device itself as the case may be.

Each component (which also may be called a "module" or "engine" or the like), of a computer system such as described in FIGS. 1-6 above, and which operates on a computer, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

This computer system may be practiced in distributed computing environments where operations are performed by multiple computers that are linked through a communications network. In a distributed computing environment, computer programs may be located in both local and remote computer storage media.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computer system comprising:
   a server computer, comprising a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage of the server computer that, when processed by the processor, instruct the processor to:
   receive, from a user device over the computer network and through the network interface, an encrypted input vector, wherein the input vector is encrypted using a public key related to the user device in an additively-homomorphic public-key encryption scheme;
   store the received encrypted input vector received from a user device in the memory;
   engage in a comparison protocol, using the processor, in which the encrypted input vector is compared to thresholds associated with decision nodes of a decision tree, so as to generate in the memory encrypted results of the comparison protocol, wherein the encrypted results represent a decision string comprising a first part accessible to the user device and a second part accessible by the server computer;
   transmit the first part of the encrypted results to the user device through the network interface and over the computer network;
   receive a request from the user device, over the computer network and through the network interface, for a value from a decision tree database corresponding to the first part of the encrypted results;
   obtain, using the processor, the value from the decision tree database using the request and the second part of the encrypted results;
   transmit, through the network interface and over the computer network, the value from the decision tree database in encrypted form to the user device; and
   wherein the user device is operative to decrypt the transmitted value from the decision tree database to provide a classification of the encrypted input vector at the user device.

2. The computer system of claim 1, wherein engaging in the comparison protocol includes effectively randomizing the decision tree.

3. The computer system of claim 2, wherein engaging in the comparison protocol comprises:
   generating a decision string as a result of evaluating the decision tree;
   randomizing the decision string.

4. The computer system of claim 3, wherein generating the decision string includes computing an encrypted comparison result for each decision node.

5. The computer system of claim 2, wherein engaging in the comparison protocol includes randomizing the decision tree.

6. The computer system of claim 5, wherein engaging in the comparison protocol further comprises computing an encrypted comparison result for each decision node as a function of a conditional value known to the server computer.

7. The computer system of claim 6, wherein engaging in the comparison protocol further comprises computing keys for transmission to the user device, wherein the keys define an encryption of results of the decision tree.

8. The computer system of claim 7, wherein the keys comprises a set of keys, each key being associated with an edge of the decision tree, and wherein engaging in the comparison protocol further comprises transmitting the keys to the user device such that each key is retrievable by the user device only if the edge associated with the key corresponds to a true comparison result between the input device decision nodes in the decision tree.

9. A computer implemented process performed by a server computer, comprising a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage of the server computer that, when processed by the processor, instruct the processor to perform a process comprising:
receiving an encrypted input vector from a user device over the computer network and through the network interface;
storing the receive encrypted input vector in the memory;
engaging in a comparison protocol, using the processor, in which the encrypted input vector is compared to thresholds associated with decision nodes of a decision tree, so as to generate in the memory encrypted results of the comparison protocol, wherein the encrypted results represent a decision string comprising a first part accessible to the user device and a second part accessible by the server computer;
transmitting the first part of the encrypted results to the user device through the network interface and over the computer network;
receiving a request from the user device, over the computer network and through the network interface, for a value from a decision tree database corresponding to the first part of the encrypted results;
obtaining, using the processor, the value from the decision tree database using the request and the second part of the encrypted results;
transmitting, through the network interface and over the computer network, the value from the decision tree database in encrypted form to the user device; and
the user device decrypting the transmitted value from the decision tree database to provide a classification of the encrypted input vector at the user device.

10. The computer implemented process of claim 9, wherein engaging in the comparison protocol includes effectively randomizing the decision tree.

11. The computer implemented process of claim 10, wherein engaging in the comparison protocol comprises:
generating a decision string as a result of evaluating the decision tree;
randomizing the decision string.

12. The computer implemented process of claim 11, wherein generating the decision string includes computing an encrypted comparison result for each decision node.

13. The computer implemented process of claim 10, wherein engaging in the comparison protocol includes randomizing the decision tree.

14. The computer implemented process of claim 13, wherein engaging in the comparison protocol further comprises computing an encrypted comparison result for each decision node as a function of a conditional value.

15. The computer implemented process of claim 14, wherein the keys comprises a set of keys, each key being associated with an edge of the decision tree, and wherein engaging in the comparison protocol further comprises transmitting the keys to the user device such that each key is retrievable by the user device only if the edge associated with the key corresponds to a true comparison result between the input device decision nodes in the decision tree.

16. An article of manufacture comprising:
computer storage having computer program instructions stored in the computer storage, that, when executed by a computer having a processor, memory connected to the processor to allow access by the processor to data stored in the memory, and persistent storage connected to the processor to allow access by the processor to data stored in the persistent storage and a network interface connected to the processor and the memory to allow access by the computer to a computer network and communicate messages over the computer network, wherein the computer program instructions, when processed by the processor, instruct the processor to perform a process comprising:
receiving an encrypted input vector from a user device over the computer network and through the network interface;
storing the receive encrypted input vector in the memory;
engaging in a comparison protocol, using the processor, in which the encrypted input vector is compared to thresholds associated with decision nodes of a decision tree, so as to generate in the memory encrypted results of the comparison protocol, wherein the encrypted results represent a decision string comprising a first part accessible to the user device and a second part accessible by the server computer;
transmitting the first part of the encrypted results to the user device through the network interface and over the computer network;
receiving a request from the user device, over the computer network and through the network interface, for a value from a decision tree database corresponding to the first part of the encrypted results;
obtaining, using the processor, the value from the decision tree database using the request and the second part of the encrypted results;
transmitting, through the network interface and over the computer network, the value from the decision tree database in encrypted form to the user device; and the user device decrypting the transmitted value from the decision tree database to provide a classification of the encrypted input vector at the user device.

17. The article of manufacture of claim 16, wherein engaging in the comparison protocol includes effectively randomizing the decision tree.

18. The article of manufacture of claim 17, wherein engaging in the comparison protocol comprises:
generating a decision string as a result of evaluating the decision tree;
randomizing the decision string.

19. The article of manufacture of claim 16, wherein engaging in the comparison protocol includes randomizing the decision tree.

20. The article of manufacture of claim 17, wherein engaging in the comparison protocol further comprises computing keys for transmission to the user device, wherein the keys define an encryption of results of the decision tree, and wherein the keys comprises a set of keys, each key being associated with an edge of the decision tree, and wherein engaging in the comparison protocol further comprises transmitting the keys to the user device such that each key is retrievable by the user device only if the edge associated with the key corresponds to a true comparison result between the input device decision nodes in the decision tree.

* * * * *